US012512554B2

(12) United States Patent
Seo et al.

(10) Patent No.: US 12,512,554 B2
(45) Date of Patent: Dec. 30, 2025

(54) METHOD OF MANUFACTURING POUCH-SHAPED BATTERY CASE HAVING VENTING GUIDE PORTION FORMED THEREIN AND POUCH-SHAPED BATTERY CASE MANUFACTURED BY THE METHOD

(71) Applicant: LG Energy Solution, Ltd., Seoul (KR)

(72) Inventors: Tai Joon Seo, Daejeon (KR); Woo Yong Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 629 days.

(21) Appl. No.: 17/774,339

(22) PCT Filed: Oct. 8, 2020

(86) PCT No.: PCT/KR2020/013793
§ 371 (c)(1),
(2) Date: May 4, 2022

(87) PCT Pub. No.: WO2021/091097
PCT Pub. Date: May 14, 2021

(65) Prior Publication Data
US 2022/0407171 A1 Dec. 22, 2022

(30) Foreign Application Priority Data
Nov. 6, 2019 (KR) .................... 10-2019-0140964

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0481* (2013.01); *H01M 50/105* (2021.01);
(Continued)

(58) Field of Classification Search
CPC .......... H01M 50/342; H01M 50/3425; H01M 50/105
See application file for complete search history.

(56) References Cited

U.S. PATENT DOCUMENTS 10,862,089 B2 * 12/2020 Jang .................... H01M 50/375
11,245,147 B2 * 2/2022 Jang .................... H01M 50/557
(Continued)

FOREIGN PATENT DOCUMENTS

CN 109417146 A 3/2019
JP H11102674 A 4/1999
(Continued)

OTHER PUBLICATIONS

International Search Report for Application No. PCT/KR2020/013793 mailed Jan. 29, 2021, 2 pages.
(Continued)

*Primary Examiner* — Haroon S. Sheikh
(74) *Attorney, Agent, or Firm* — Lerner David LLP

(57) ABSTRACT

The present invention relates to a pouch-shaped battery case manufacturing method including (a) locating a laminate sheet for pouch-shaped battery cases on a lower press die, (b) pressing the laminate sheet using an upper press die to form an electrode assembly receiving portion, (c) forming a venting guide portion in the bottom of the electrode assembly receiving portion, and (d) separating a pouch-shaped battery case having the electrode assembly receiving portion and the venting guide portion formed therein from the lower press die.

6 Claims, 4 Drawing Sheets

(51) Int. Cl.
*H01M 50/105* (2021.01)
*H01M 50/124* (2021.01)
*H01M 50/183* (2021.01)

(52) U.S. Cl.
CPC ..... *H01M 50/1245* (2021.01); *H01M 50/183* (2021.01); *H01M 2200/20* (2013.01)

(56) References Cited

U.S. PATENT DOCUMENTS

| | | | |
|---|---|---|---|
| 11,417,906 B2* | 8/2022 | Song | H01M 10/04 |
| 2005/0106451 A1* | 5/2005 | Kim | H01M 50/3425 |
| | | | 429/82 |
| 2010/0266881 A1 | 10/2010 | You et al. | |
| 2011/0206983 A1* | 8/2011 | Hano | H01M 50/119 |
| | | | 429/166 |
| 2014/0017524 A1* | 1/2014 | Ootsuka | B21D 51/383 |
| | | | 72/352 |
| 2014/0030564 A1 | 1/2014 | Lee | |
| 2015/0037626 A1 | 2/2015 | Malcolm et al. | |
| 2016/0260552 A1* | 9/2016 | Sato | H01M 50/178 |
| 2019/0097195 A1 | 3/2019 | Karulkar et al. | |
| 2019/0165407 A1 | 5/2019 | Song et al. | |
| 2019/0181408 A1 | 6/2019 | Jang et al. | |
| 2020/0331187 A1 | 10/2020 | Suh et al. | |

FOREIGN PATENT DOCUMENTS

| | | |
|---|---|---|
| JP | H11312505 A | 11/1999 |
| JP | 2001205700 A | 7/2001 |
| JP | 2004-052100 A | 2/2004 |
| JP | 2014022224 A | 2/2014 |
| JP | 2016039094 A | 3/2016 |
| KR | 20030035187 A | 5/2003 |
| KR | 20080094602 A | 10/2008 |
| KR | 20090016279 A | 2/2009 |
| KR | 101273472 B1 | 6/2013 |
| KR | 20170075454 A | 7/2017 |
| KR | 20170111750 A | 10/2017 |
| KR | 20180059373 A | 6/2018 |
| KR | 20180116563 A | 10/2018 |
| KR | 20190068049 A | 6/2019 |
| KR | 20190105765 A | 9/2019 |

OTHER PUBLICATIONS

Extended European Search Report issued in Appln. No. 20884056.1 dated Nov. 17, 2022 (10 pages).

* cited by examiner

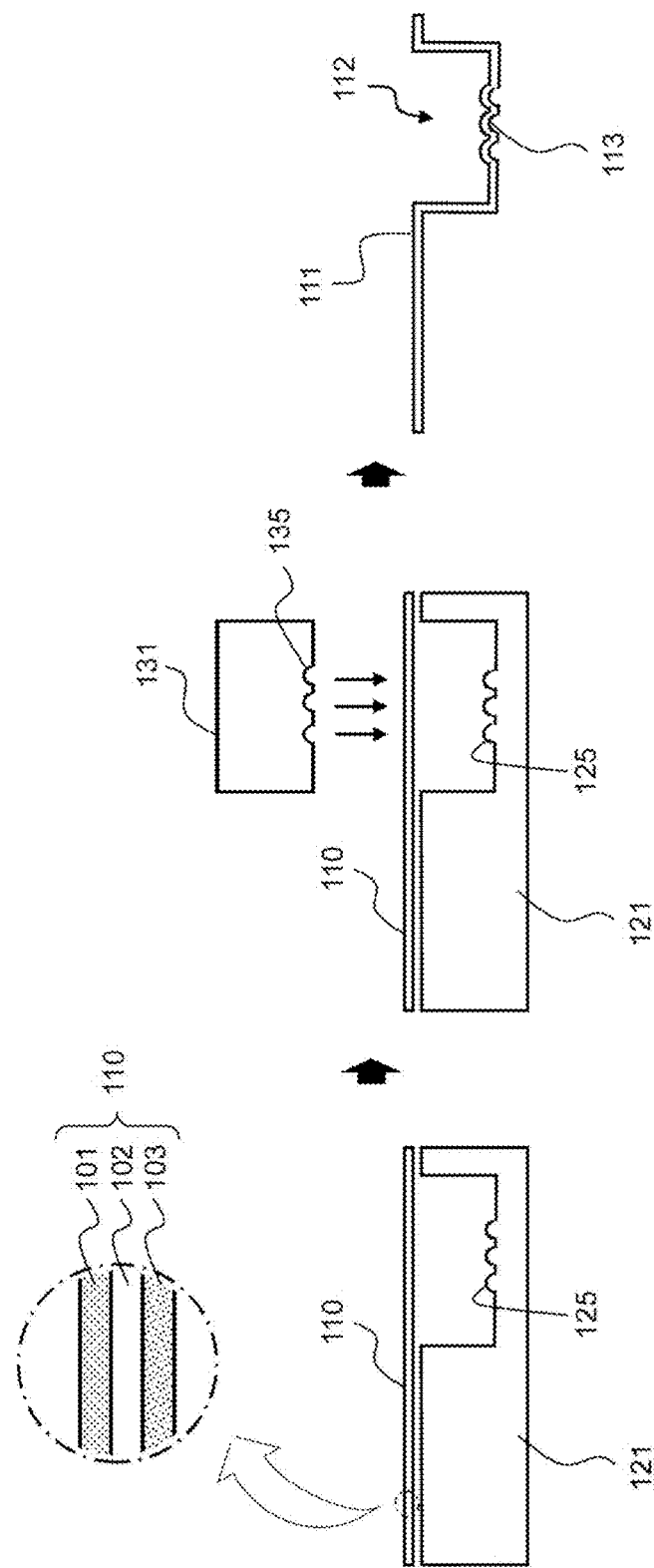
[FIG. 1]

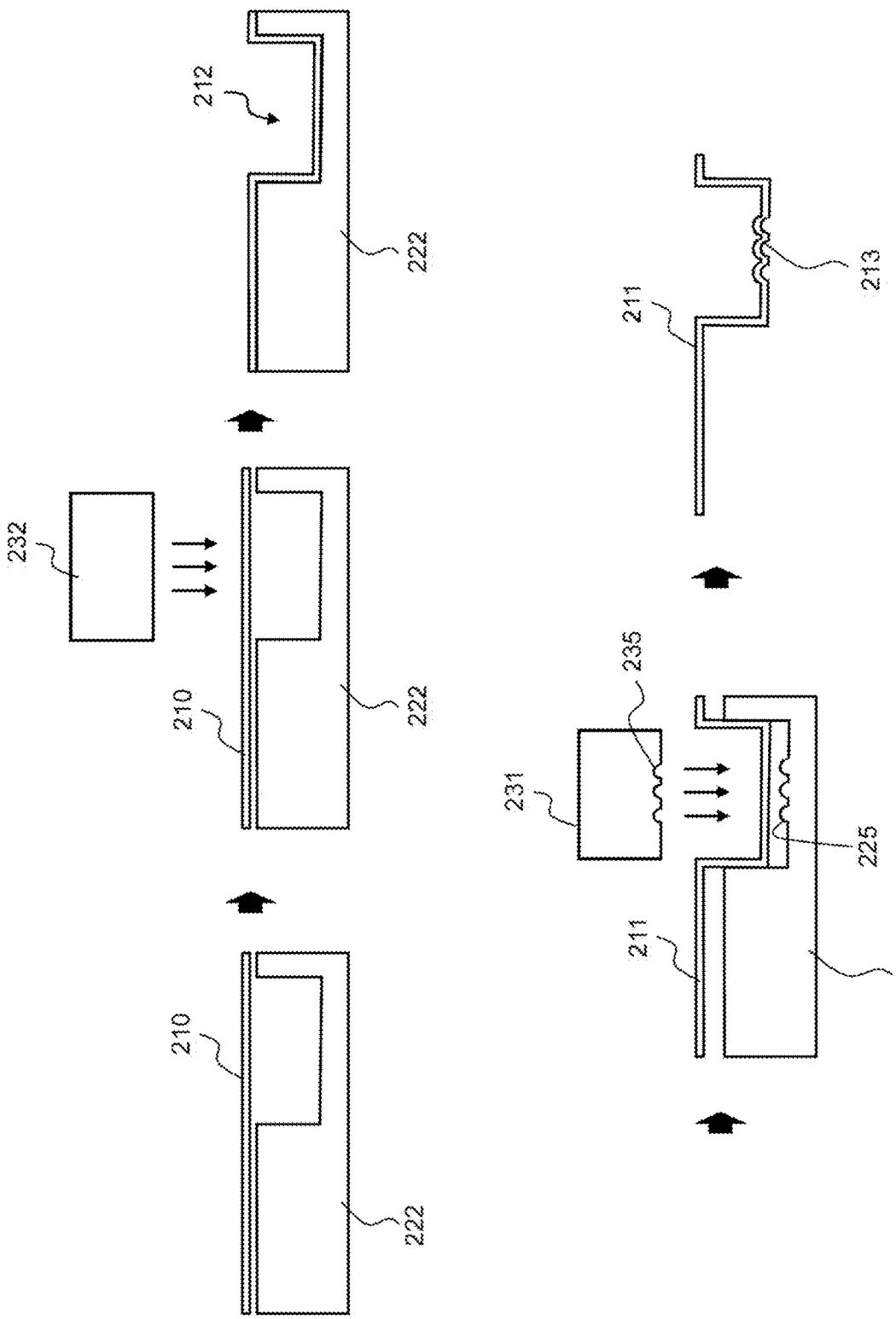
[FIG. 2]

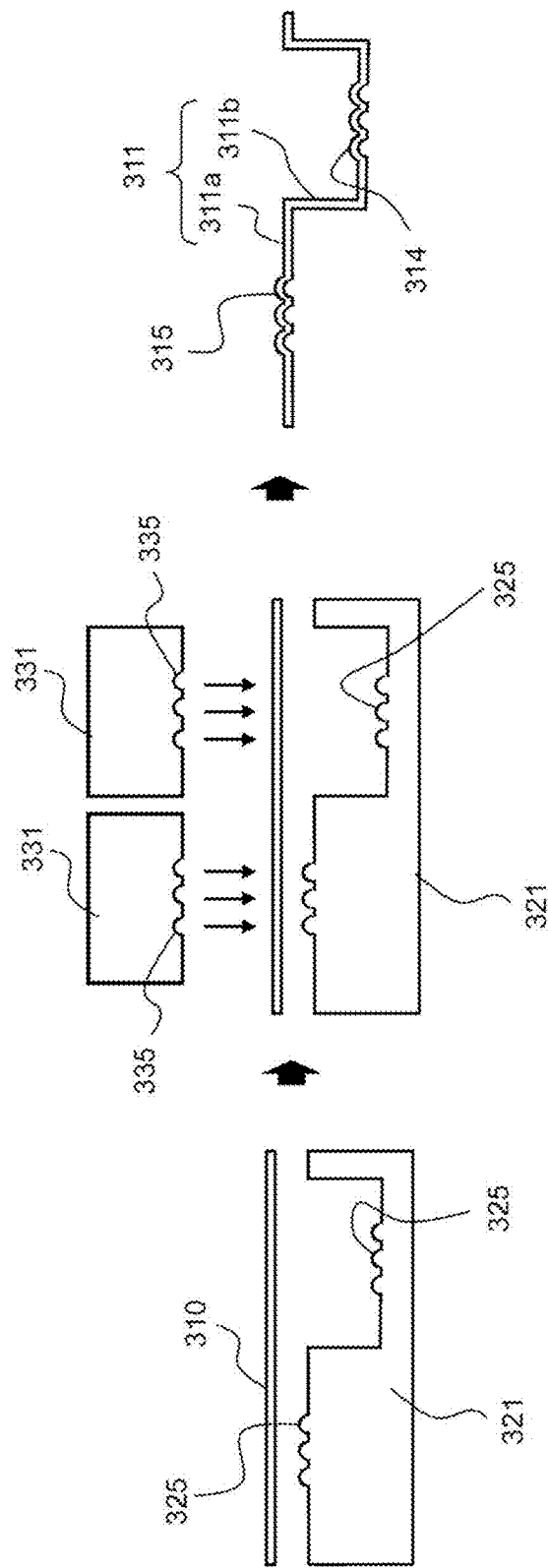
[FIG. 3]

[FIG. 4]
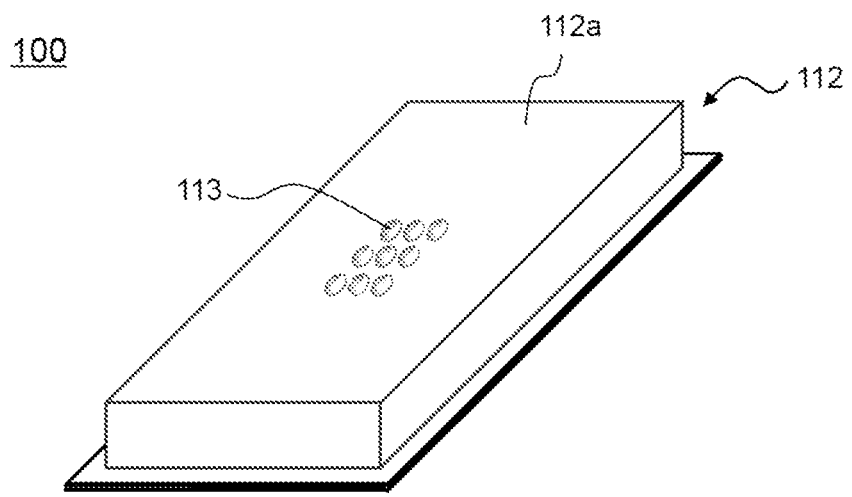

METHOD OF MANUFACTURING POUCH-SHAPED BATTERY CASE HAVING VENTING GUIDE PORTION FORMED THEREIN AND POUCH-SHAPED BATTERY CASE MANUFACTURED BY THE METHOD

CROSS-REFERENCE TO RELATED APPLICATIONS

This application is a national stage entry under 35 U.S.C. § 371 of International Application No. PCT/KR2020/013793, filed on Oct. 8, 2020, published in Korean, which claims priority to Korean Patent Application No. 10-2019-0140964, filed on Nov. 6, 2019, the disclosures of which are hereby incorporated herein by reference in their entireties.

TECHNICAL FIELD

The present invention relates to a method of manufacturing a pouch-shaped battery case having a venting guide portion formed therein and a pouch-shaped battery case manufactured by the method, and more particularly to a pouch-shaped battery case manufacturing method including a process of forming a venting guide portion in a portion of a pouch-shaped battery case in a process of manufacturing the pouch-shaped battery case and a pouch-shaped battery case manufactured thereby.

BACKGROUND ART

A lithium secondary battery may be generally classified as a cylindrical secondary battery, a prismatic secondary battery, or a pouch-shaped secondary battery based on the external appearance thereof, and may be classified as a lithium ion battery, a lithium ion polymer battery, a lithium polymer battery, or an all-solid-state battery based on the form of an electrolytic solution.

With a trend of miniaturization and weight reduction of wearable devices and mobile devices, demand for a prismatic or pouch-shaped battery having a small thickness has increased. In particular, an interest in a pouch-shaped secondary battery is high, since the weight of a battery case can be remarkably reduced, whereby weight reduction of the battery is possible, and various changes in shape are possible, compared to a cylindrical or prismatic secondary battery, which uses a metal can. The pouch-shaped secondary battery has an electrode assembly mounted in a pouch-shaped battery case made of a laminate sheet including a resin layer and a metal layer.

For the lithium secondary battery, temperatures of an electrode assembly, an electrical connection member, and the like increase due to heat generated during continuous charging and discharging processes thereof. When the temperature in the lithium secondary battery increases, as described above, an electrolytic solution is decomposed to generate gas, whereby a battery case swells. In addition, a middle- or large-sized battery pack has a structure in which a plurality of battery cells is mounted in a predetermined case in the state of being fixed. Consequently, swollen battery cells are further pressurized in the limited case, and therefore a danger of ignition and explosion increases under abnormal operating conditions.

Various attempts were made to lower such a danger of the lithium secondary battery. Patent Document 1 discloses a lithium polymer battery including a rupture layer formed on the outer surface of a case by coating in a direction in which the case shrinks due to an increase in the internal pressure of the battery so as to be ruptured first of all in order to discharge gas outside. The rupture layer is a polymer material coated on the outer surface of the case so as to have a predetermined width. The polymer material has high elongation.

Patent Document 2 discloses a battery cell having a vulnerable portion formed on the portion of a sealing portion corresponding to an electrode lead having relatively low flexibility, which is one of a pair of electrode leads connected to an electrode assembly, the vulnerable portion being configured to be physically deformed when predetermined pressure is applied thereto such that gas is discharged from the battery cell.

However, Patent Document 1 and Patent Document 2 do not suggest a concrete method of forming the rupture layer or the vulnerable portion.

Meanwhile, Patent Document 3 discloses a method of manufacturing a pouch-shaped secondary battery including a step of installing an inner blocking line and an outer blocking line at a gas pocket portion along the edge of an electrode assembly so as to be adjacent to the electrode assembly. However, the inner and outer blocking lines are merely a structure configured to prevent an electrolytic solution from being discharged in a degassing process at the time of manufacture of the pouch-shaped secondary battery, and technology for securing safety of the pouch-shaped secondary battery is not disclosed.

Accordingly, there is a need to develop a method of guiding rupture of the outer surface of a pouch-shaped battery case to prevent explosion of the battery case in a process of manufacturing a pouch-shaped secondary battery.

PRIOR ART DOCUMENTS (Patent Document 1) Korean Patent Application Publication No. 2003-0035187 (2003 May 9)
(Patent Document 2) Korean Patent Application Publication No. 2008-0094602 (2008 Oct. 23)
(Patent Document 3) Korean Patent Application Publication No. 2018-0059373 (2018 Jun. 4)

DISCLOSURE

Technical Problem

The present invention has been made in view of the above problems, and it is an object of the present invention to provide a pouch-shaped battery case manufacturing method capable of simplifying a pouch-shaped battery case manufacturing process by forming a venting guide portion while a pouch-shaped battery case is formed and manufacturing a pouch-shaped battery case including a structure configured to guide rupture when the internal pressure of the pouch-shaped battery case increases in order to prevent explosion and a pouch-shaped battery case manufactured by the method.

Technical Solution

In order to accomplish the above object, a pouch-shaped battery case manufacturing method according to the present invention may include (a) locating a laminate sheet for pouch-shaped battery cases on a lower press die, (b) pressing the laminate sheet using an upper press die to form an electrode assembly receiving portion, (c) forming a venting guide portion in the bottom of the electrode assembly receiving portion, and (d) separating a pouch-shaped battery case having the electrode assembly receiving portion and the venting guide portion formed therein from the lower press die.

In an embodiment, step (b) and step (c) may be simultaneously performed, the upper press die may be a first upper press die, the size of the lower surface of the first upper press die corresponding to the size of the bottom of the electrode assembly receiving portion, a recess being formed in the lower surface of the first upper press die, and the lower press die may be a first lower press die, a protrusion being formed on the upper surface of the first lower press die corresponding to the recess of the first upper press die.

In another embodiment, step (b) and step (c) may be sequentially performed, in step (b), a second upper press die and a second lower press die may be used, the size of the lower surface of each of the second upper press die and the second lower press die corresponding to the size of the bottom of the electrode assembly receiving portion, and in step (c), a first upper press die may be used, the size of the lower surface of the first upper press die corresponding to the size of the bottom of the electrode assembly receiving portion, a recess being formed in the lower surface of the first upper press die, and a first lower press die may be used, a protrusion being formed on the upper surface of the first lower press die corresponding to the recess of the first upper press die.

The recess may be formed in a central portion of the first upper press die.

The protrusion may be inserted into the recess, the recess and the protrusion may correspond in size and shape to each other, and the shape of the protrusion may be any one of a multilateral pyramid, a truncated multilateral pyramid, a cone, a truncated cone, and a hemisphere.

The protrusion may include a plurality of protrusions intensively formed on a central portion of the lower press die.

Step (c) may be performed a plurality of times in order to reduce the thickness of a metal layer of the venting guide portion.

Also, step (c) may include punching the laminate sheet a plurality of times.

A pouch-shaped battery case according to the present invention is constituted by an upper case and a lower case, each of the upper case and the lower case including an outer coating layer, a metal layer, and an inner adhesive layer, wherein an electrode assembly receiving portion is formed in at least one of the upper case and the lower case, and a venting guide portion is formed in the electrode assembly receiving portion.

The thickness of the metal layer at the venting guide portion may be less than the thickness of the bottom of the electrode assembly receiving portion excluding the venting guide portion.

The venting guide portion may be formed in a central portion of the bottom of the electrode assembly receiving portion.

The venting pressure of the venting guide portion may be lower than the venting pressure of an upper case and lower case sealing portion sealed by thermal fusion.

In addition, the present invention provides a pouch-shaped battery cell including the pouch-shaped battery case.

DESCRIPTION OF DRAWINGS

FIG. 1 is a schematic view of a pouch-shaped battery case manufacturing method according to a first embodiment.

FIG. 2 is a schematic view of a pouch-shaped battery case manufacturing method according to a second embodiment.

FIG. 3 is a schematic view of a pouch-shaped battery case manufacturing method according to a third embodiment.

FIG. 4 is a perspective view of a pouch-shaped battery case manufactured according to the manufacturing method of FIG. 1.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition in this specification may be applied to all inventions, unless particularly restricted, and does not limit a specific invention.

Hereinafter, embodiments of the present invention will be described in detail with reference to the accompanying drawings.

FIG. 1 is a schematic view of a pouch-shaped battery case manufacturing method according to a first embodiment.

Referring to FIG. 1, a laminate sheet 110 for pouch-shaped battery cases includes an outer coating layer 101, a metal layer 102, and an inner adhesive layer 103, and may further include an adhesive layer between the outer coating layer and the metal layer and between the metal layer and the inner adhesive layer depending on circumstances.

The laminate sheet 110 for pouch-shaped battery cases is located on a first lower press die 121, and the laminate sheet 110 is pressed using a first upper press die 131 to form an electrode assembly receiving portion 112 and a venting guide portion 113.

The size of the lower surface of the first upper press die 131 corresponds to the size of the bottom of the electrode assembly receiving portion 112, and a recess 135 is formed in the lower surface of the first upper press die. A protrusion 125 is formed on the upper surface of the first lower press die 121 at the position corresponding to the recess 135 of the first upper press die 131.

The recess 135 of the first upper press die 131 is formed in a central portion of the lower surface of the first upper press die 131, and the protrusion 125 of the first lower press die 121 is formed on a central portion of the upper surface of the first lower press die 121.

In a pouch-shaped battery case 111 manufactured through the above process, therefore, the venting guide portion 113 is formed in a central portion of the bottom of the electrode assembly receiving portion 112.

In consideration of the fact that, when a battery case swells due to an increase in internal pressure of a lithium secondary battery, venting is generally performed at a portion on which pressure is concentrated, it is preferable that the venting guide portion be formed in the central portion of the electrode assembly receiving portion. Consequently, a plurality of protrusions 125 may be formed, and particularly the plurality of protrusions may be formed so as to be concentrated on the central portion of the lower press die.

In the present invention, the protrusions 125 of the lower press die are inserted into the recesses 135 of the upper press die, and the recesses 135 and the protrusions 125 correspond in size and shape to each other.

For example, each of the protrusions 125 may be formed in the shape of any one of a multilateral pyramid, a truncated multilateral pyramid, a cone, a truncated cone, and a hemisphere, and specifically may be formed in the shape of a hemisphere.

In the above process, (c) the step of forming the venting guide portion may be performed through a process of punching the laminate sheet 110 using the first upper press die 131, and the punching process may be repeatedly performed a plurality of times in order to reduce the thickness of the metal layer 102 of the laminate sheet 110 at the venting guide portion.

The pouch-shaped battery case 111 having the electrode assembly receiving portion and the venting guide portion formed therein as described above is separated from the first lower press die 121.

In the pouch-shaped battery case according to the present invention, as described above, the thickness of the metal layer at the venting guide portion is formed so as to be less than the thickness of the bottom of the electrode assembly receiving portion excluding the venting guide portion. When the internal pressure of the lithium secondary battery increases, therefore, the pressure may be concentrated on the venting guide portion, whereby the venting guide portion is rapidly ruptured to discharge gas.

Before explosion occurs due to an increase in the internal pressure of the lithium secondary battery, therefore, the venting guide portion is ruptured, whereby it is possible to secure safety of the lithium secondary battery.

Also, in the case in which the electrode assembly receiving portion and the venting guide portion are simultaneously formed, as in the pouch-shaped battery case manufacturing method shown in FIG. 1, it is possible to simplify the process of manufacturing the pouch-shaped battery case, whereby it is possible to reduce manufacturing cost and to improve productivity.

FIG. 2 is a schematic view of a pouch-shaped battery case manufacturing method according to a second embodiment.

In the pouch-shaped battery case manufacturing method of FIG. 2, (b) a step of forming an electrode assembly receiving portion and (c) a step of forming a venting guide portion are sequentially performed, unlike the pouch-shaped battery case manufacturing method of FIG. 1.

Specifically, referring to FIG. 2, a laminate sheet 210 is located on a second lower press die 222, and the laminate sheet 210 is pressed using a second upper press die 232 to form an electrode assembly receiving portion 212.

Subsequently, a pouch-shaped battery case having the electrode assembly receiving portion 212 formed therein is located on a first lower press die 221, and the pouch-shaped battery case 211 is pressed using a first upper press die 231 having recesses 235 formed therein to form a venting guide portion 213.

The venting guide portion forming method is identical to what was described with reference to FIG. 1.

In addition, the first lower press die 221 and the first upper press die 231 are identical in structure, position, and shape of recesses and protrusions to the first lower press die 121 and the first upper press die 131 described with reference to FIG. 1, respectively, and therefore a description thereof will be omitted.

In the case in which the electrode assembly receiving portion and the venting guide portion are sequentially formed, as in the pouch-shaped battery case manufacturing method shown in FIG. 2, the laminate sheet is primarily stretched when the electrode assembly receiving portion is formed, and the venting guide portion is formed in the state in which the laminate sheet is primarily stretched. Consequently, it is possible to independently perform a process of punching the laminate sheet using the first upper press die several times, whereby it is possible to further reduce the thickness of a metal layer of the laminate sheet and to diminish a thickness deviation of the metal layer.

FIG. 3 is a schematic view of a pouch-shaped battery case manufacturing method according to a third embodiment.

Referring to FIG. 3, in the pouch-shaped battery case manufacturing method shown in FIG. 3, (b) a step of forming an electrode assembly receiving portion and (c) a step of forming a venting guide portion are simultaneously performed, as in the same manner as in the method shown in FIG. 1.

Consequently, a first lower press die 321 shown in FIG. 3 has protrusions 325 formed on the upper surface thereof, and a first upper press die 331 has recesses 335 formed in the lower surface thereof.

In addition, a pouch-shaped battery case 311 has a structure in which a venting guide portion 315 and a venting guide portion 314 are formed in an upper case 311a and a lower case 311b, respectively. The protrusions 325 are formed on the parts of the first lower press die 321 at which a preliminary upper case portion and a preliminary lower case portion of a laminate sheet are disposed, and two first upper press dies 331 are moved downwards to positions corresponding to the protrusions to punch the laminate sheet.

FIG. 4 is a perspective view of a pouch-shaped battery case manufactured according to the manufacturing method of FIG. 1.

Referring to FIG. 4, a pouch-shaped battery cell 100 has a structure in which an electrode assembly receiving portion 112 is formed in any one of an upper case and a lower case, and a venting guide portion 113 is formed in a central portion of the bottom 112a of the electrode assembly receiving portion.

The thickness of a metal layer of a laminate sheet at the venting guide portion is formed so as to be less than the thickness of the portion of the bottom of the electrode assembly receiving portion excluding the venting guide portion. When the battery case swells, therefore, the venting guide portion, the physical strength of which is low, is ruptured first.

In addition, the venting pressure of the venting guide portion 113 is lower than the venting pressure of an upper case and lower case sealing portion, which is sealed by thermal fusion. When the internal pressure of the pouch-shaped battery cell increases, therefore, the venting guide portion is ruptured first before the upper case and lower case sealing portion is vented.

In the pouch-shaped battery case manufacturing method according to the present invention, as described above, the venting guide portion is formed as a structure for securing safety of a pouch-shaped battery cell, and the process of forming the venting guide portion is included in the process of forming the pouch-shaped battery case. Consequently, it is possible to improve safety of the pouch-shaped battery cell without increasing the steps of manufacturing the pouch-shaped battery case.

Those skilled in the art to which the present invention pertains will appreciate that various applications and modifications are possible within the category of the present invention based on the above description.

DESCRIPTION OF REFERENCE SYMBOLS

100: Pouch-shaped battery cell
101: Outer coating layer
102: Metal layer
103: Inner adhesive layer
110, 210, 310: Laminate sheets
111, 211, 311: Pouch-shaped battery cases
112, 212: Electrode assembly receiving portions
112a: Bottom of electrode assembly receiving portion
113, 213, 314, 315: Venting guide portions
121, 221, 321: First lower press dies
125, 225, 325: Protrusions
131, 231, 331: First upper press dies
135, 235, 335: Recesses
222: Second lower press die
232: Second upper press die
311a: Upper case
311b: Lower case

INDUSTRIAL APPLICABILITY

As is apparent from the above description, in a pouch-shaped battery case manufacturing method according to the present invention, a venting guide portion is formed while a battery case is formed, whereby it is possible to simplify a manufacturing process.

Also, a pouch-shaped battery case according to the present invention is configured such that, when the pouch-shaped battery case swells due to an increase in internal pressure thereof, a venting guide portion is ruptured, whereby it is possible to prevent explosion of a pouch-shaped secondary battery.

The invention claimed is:

1. A method of manufacturing a pouch-shaped battery case, the method comprising:
 (a) locating a laminate sheet on a lower press die;
 (b) pressing the laminate sheet using an upper press die to form an electrode assembly receiving portion of the pouch-shaped battery case;
 (c) forming a venting guide portion in a bottom of the electrode assembly receiving portion that is pressed, the venting guide portion being one or more recesses extending into the electrode assembly receiving portion from a planar surface of a center of the electrode assembly receiving portion; and
 (d) separating the pouch-shaped battery case having the electrode assembly receiving portion and the venting guide portion formed therein from the lower press die,
 wherein step (b) and step (c) are simultaneously performed,
 the upper press die is a first upper press die, a size of a lower surface of the first upper press die conforms to a size of the bottom of the electrode assembly receiving portion, a recess being formed in the lower surface of the first upper press die,
 the lower press die is a first lower press die, a protrusion being formed on an upper surface of the first lower press die that is complementary in size and shape to the recess of the first upper press die, and
 the protrusion is inserted into the recess, or
 wherein step (b) and step (c) are sequentially performed,
 the upper press die is a first upper press die, and the lower press die is a first lower press die,
 during step (b), a second upper press die and a second lower press die are used, a size of a lower surface of each of the second upper press die and the second lower press die conforming to a size of the bottom of the electrode assembly receiving portion,
 during step (c), the first upper press die is used, a size of a lower surface of the first upper press die conforms to the size of the bottom of the electrode assembly receiving portion, a recess being formed in the lower surface of the first upper press die, and the first lower press die is used, a protrusion being formed on an upper surface of the first lower press die that is complementary in shape to the recess of the first upper press die, and
 the protrusion is inserted into the recess.

2. The method according to claim 1, wherein the recess is formed in a central portion of the first upper press die.

3. The method according to claim 1, wherein the shape of the protrusion is any one of a multilateral pyramid, a truncated multilateral pyramid, a cone, a truncated cone, or a hemisphere.

4. The method according to claim 3, wherein the protrusion comprises a plurality of protrusions concentrated on a central portion of the lower press die.

5. The method according to claim 1, wherein step (b) is performed a plurality of times, thereby reducing a thickness of a metal layer of the venting guide portion.

6. The method according to claim 5, wherein step (c) comprises contacting the laminate sheet with the upper press die a plurality of times.

* * * * *